Patented Nov. 15, 1949

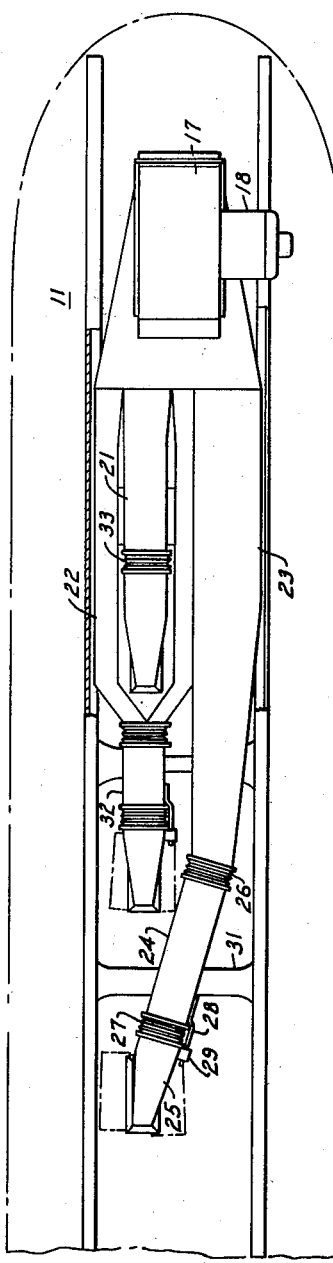
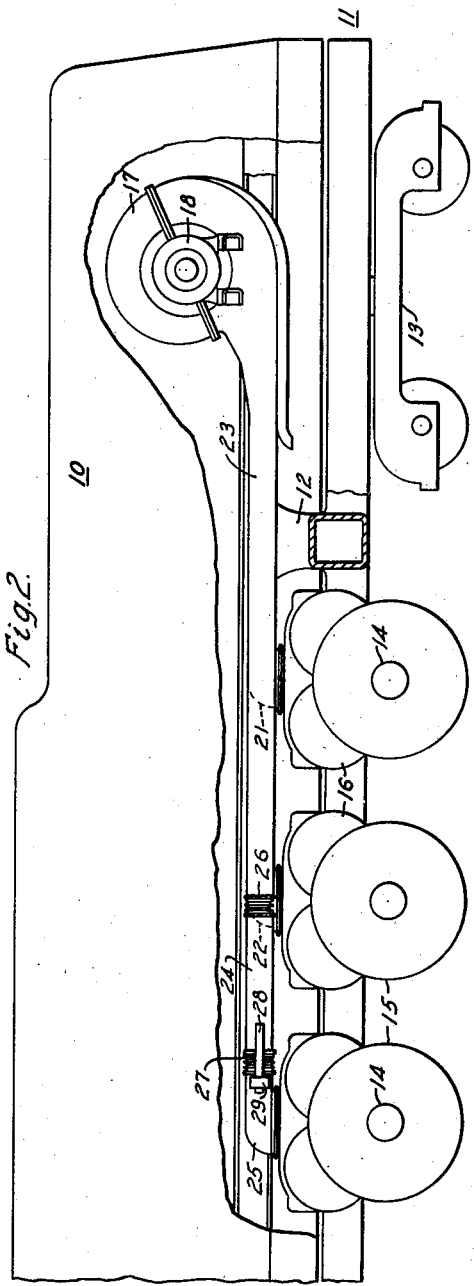

2,488,460

UNITED STATES PATENT OFFICE 2,488,460

PIPE JOINT

Charles C. Whittaker and William H. Eunson, Pittsburgh, Pa., assignors to Westinghouse Electric Corporation, East Pittsburgh, Pa., a corporation of Pennsylvania Application May 10, 1946, Serial No. 668,981

5 Claims. (Cl. 285—90)

Our invention relates, generally, to locomotive structures, and, more particularly, to air duct systems for electric locomotives.

In order to increase their horsepower rating, the traction motors of electric locomotives may be ventilated by air delivered by motor driven blowers located in the cab of the locomotive. In the past, a duct for the air from a blower has been rigidly mounted in the under part of the cab. Air outlets from this duct were connected to the traction motors by means of flexible bellows. However, there is a limit to the amount of flexibility that can be obtained with such a structure.

This limit was exceeded on locomotives of certain types in which the swing between certain motors and the air duct was beyond the reach of bellows which could be installed in the available space. Accordingly, a metal sliding or telescopic device was utilized in place of a bellows. This device was only partially successful as it leaked a large amount of air. Furthermore, it was usually so bent when changing a motor that it leaked still more air.

An object of our invention, generally stated, is to provide a flexible air duct which shall be simple and efficient in operation and which may be economically manufactured and installed.

A more specific object of our invention is to provide a flexible air duct which shall permit a relatively large amount of movement between fixed and movable members connected by the duct.

Another object of our invention is to provide a flexible air duct which may be installed in a restricted space.

A further object of our invention is to control the movement of a movable member of a flexible air duct.

Other objects of our invention will be explained fully hereinafter or will be apparent to those skilled in the art.

In accordance with one embodiment of our invention, a floating section of duct is so connected between fixed and movable sections by flexible bellows that a relatively large amount of movement is permitted between the fixed and movable sections with a relatively small deflection of the bellows.

For a fuller understanding of the nature and objects of our invention, reference may be had to the following detailed description, taken in conjunction with the accompanying drawing, in which:

Figure 1 is a view, in plan, of a portion of an electric locomotive embodying the principal features of our invention; and Fig. 2 is a view, in side elevation, of the locomotive structure shown in Fig. 1, a portion being broken away for clearness.

Referring to the drawing, the portion of the locomotive structure shown therein comprises a cab 10 which is supported on a main truck frame 11 by a center pin 12, a guiding truck 13, a plurality of axles 14 having driving wheels 15 secured thereto, and motors 16 of the twin type for driving the axles 14. Only substantially half of the cab and one main truck frame are shown in the drawing, the other main truck frame and other half of the cab being similar to the parts illustrated.

As shown, a blower 17, which is driven by a motor 18, is mounted in the cab 10 for supplying air to the motors 16 through ventilating ducts 21, 22 and 23. The duct 21 is connected to the motor for the first axle, the duct 22 is connected to the motor for the second axle and the duct 23 is connected to the motor for the third axle.

As shown, portions of the duct 22 are disposed on opposite sides of the duct 21 because of space limitations. The two portions are joined into a single pipe before entering the motor for the second axle.

As shown by the broken lines in Fig. 1, the motor for the third axle, which is the farthest from the center pin 12, swings laterally a relatively great distance when the locomotive is going around curves. Therefore, it is necessary to provide a large amount of flexibility in the duct 23.

According to our invention, this is accomplished by providing a floating duct member 24 which is disposed between the fixed member 23 and a swinging member 25 which is connected to the motor housing and swings laterally with the motor. One end of the floating member 24 is connected to the fixed member 23 by an accordion bellows 26 and the other end is connected to the swinging member 25 by a similar bellows 27. In this manner, the deflection of the bellows is relatively small, even for maximum swing, and is well within the limits of expansion and compression for a bellows of the accordion type. The bellows are preferably molded from rubber or a similar material.

The movement of the floating member 24 may be controlled by a bar 28, one end of which is secured to the member 24 and the other end of which is slidably disposed in a block 29 secured to the swinging member 25. As the motor swings relative to the cab, the bridging bar 28 causes the floating member 24 to move with the swinging member 25, thereby removing the mechanical strain of dragging the floating duct from the bellows.

In the present locomotive, a cross member 31 of the truck frame may be utilized to support the weight of the floating member. When no cross member is available, a suitable support may be provided, or, by making the floating member of a light material, such as aluminum, the weight can be carried by the bellows.

A floating member 32, similar to the member 24, but shorter in length, may be provided for the duct 22. The member 32 may be connected to the fixed and swinging members in the manner hereinbefore described. Since the motor for the first axle is located closely to the center pin 12, one flexible bellows 33 is sufficient for the short swing of this motor. A blower and ducts, similar to those described, may be provided for the motors on the other main truck.

From the foregoing description, it is apparent that we have provided a ventilating duct system for an electric locomotive which is simple in construction, has a large amount of flexibility, and may be installed in a restricted space. Furthermore, leakage of air from the duct system is prevented.

Since numerous changes may be made in the above-described construction and different embodiments of the invention may be made without departing from the spirit and scope thereof, it is intended that all matter contained in the foregoing description or shown in the drawing shall be interpreted as illustrative and not in a limiting sense.

We claim as our invention:

1. A ventilating duct comprising a fixed member, a swinging member spaced from the fixed member, a floating member disposed between the fixed member and the swinging member, accordion bellows for connecting the floating member to said fixed member and said swinging member, and a bar having one end secured to the floating member and the other end slidably connected to the swinging member to control the movement of the floating member.

2. A ventilating duct comprising a fixed member, a swinging member spaced from the fixed member, a floating member disposed between the fixed member and the swinging member, flexible means for connecting one end of the floating member to the fixed member and the other end to the swinging member, a bar bridging the flexible means between the floating member and the swinging member, and a block secured to one of said members and having an opening therethrough, one end of said bar being slidably disposed in said opening and the other end being secured to the other of said members to control the movement of the floating member.

3. A ventilating duct comprising a fixed member, a swinging member spaced from the fixed member, a floating member disposed between the fixed member and the swinging member, accordion bellows for connecting one end of the floating member to the fixed member and the other end to the swinging member, a bar having one end secured to the floating member, and a block secured to the swinging member and having an opening therein for receiving the other end of the bar to control the movement of the floating member.

4. A ventilating duct comprising a fixed member, a swinging member spaced from the fixed member, a floating member disposed between the fixed member and the swinging member, flexible means for connecting one end of the floating member to the fixed member and the other end to the swinging member, slotted means on the swinging member, and a bar having one end disposed in said slotted means and the other end secured to the floating member for controlling the movement of the floating member.

5. A ventilating duct comprising a fixed member, a swinging member spaced from the fixed member, a floating member disposed between the fixed member and the swinging member, accordion bellows for connecting one end of the floating member to the fixed member and the other end to the swinging member, bar means bridging the bellows between the floating member and the swinging member for controlling the movement of the floating member, one end of said bar being secured to one of said members, and slotted means secured to the other member for receiving the other end of said bar.

CHARLES C. WHITTAKER.
WILLIAM H. EUNSON.

REFERENCES CITED

The following references are of record in the file of this patent:

UNITED STATES PATENTS

| Number | Name | Date |
|---|---|---|
| 283,839 | Wells | Aug. 28, 1883 |
| 2,014,355 | Hussman | Sept. 10, 1935 |
| 2,337,038 | Fentress | Dec. 21, 1943 |